(12) United States Patent
Tajika et al.

(10) Patent No.: US 9,205,475 B2
(45) Date of Patent: Dec. 8, 2015

(54) UOE STEEL PIPE AND STRUCTURE

(71) Applicant: JFE Steel Corporation, Tokyo (JP)

(72) Inventors: Hisakazu Tajika, Tokyo (JP); Takahiro Sakimoto, Tokyo (JP); Satoshi Igi, Tokyo (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 14/389,941

(22) PCT Filed: Apr. 2, 2013

(86) PCT No.: PCT/JP2013/060108
§ 371 (c)(1),
(2) Date: Oct. 1, 2014

(87) PCT Pub. No.: WO2013/151056
PCT Pub. Date: Oct. 10, 2013

(65) Prior Publication Data
US 2015/0090361 A1 Apr. 2, 2015

(30) Foreign Application Priority Data

Apr. 2, 2012 (JP) ................................ 2012-083904
Apr. 2, 2012 (JP) ................................ 2012-083907

(51) Int. Cl.
| | |
|---|---|
| *F16L 11/00* | (2006.01) |
| *B21C 37/16* | (2006.01) |
| *B21C 37/08* | (2006.01) |
| *B21C 37/30* | (2006.01) |
| *B23K 31/02* | (2006.01) |
| *B23K 11/093* | (2006.01) |
| *B21D 5/01* | (2006.01) |

(52) U.S. Cl.
CPC ................. *B21C 37/16* (2013.01); *B21C 37/08* (2013.01); *B21C 37/0803* (2013.01); *B21C 37/0815* (2013.01); *B21C 37/30* (2013.01); *B21D 5/015* (2013.01); *B23K 11/0935* (2013.01); *B23K 31/02* (2013.01); *B23K 2201/06* (2013.01)

(58) Field of Classification Search
USPC .......................................... 138/121, 171, 156
See application file for complete search history.

(56) References Cited

U.S. PATENT DOCUMENTS

| | | | | |
|---|---|---|---|---|
| 1,852,921 | A * | 4/1932 | Dreyer | ........................... 228/146 |
| 4,339,941 | A * | 7/1982 | Taira et al. | ..................... 72/412 |
| 4,590,781 | A * | 5/1986 | Toyooka | ......................... 72/181 |

(Continued)

FOREIGN PATENT DOCUMENTS

| | | |
|---|---|---|
| JP | 49-65980 | 6/1974 |
| JP | 53-104563 | 9/1978 |

(Continued)

OTHER PUBLICATIONS

Extended European Search Report dated Jul. 1, 2015 from corresponding European Application No. EP 13772897.

(Continued)

*Primary Examiner* — James Hook
(74) *Attorney, Agent, or Firm* — DLA Piper LLP (US)

(57) ABSTRACT

A UOE steel pipe used to form a structure by performing butt circumferential welding and having an outside diameter shape in a waveform in a longitudinal direction is shaped to have no local minimum of the outside diameter shape in the waveform within a predetermined length from both longitudinal end portions.

8 Claims, 7 Drawing Sheets

(56) References Cited

U.S. PATENT DOCUMENTS

| | | | |
|---|---|---|---|
| 4,603,806 A * | 8/1986 | Watanabe et al. | 228/152 |
| 4,953,632 A * | 9/1990 | Sakaya et al. | 165/104.26 |
| 5,836,189 A * | 11/1998 | Streubel et al. | 72/51 |
| 6,782,921 B1 * | 8/2004 | Tsuru et al. | 138/142 |
| 2003/0159289 A1 * | 8/2003 | Van Giezen | 29/897.2 |
| 2003/0211352 A1 * | 11/2003 | Ooyauchi et al. | 428/600 |
| 2011/0036440 A1 * | 2/2011 | Frohne et al. | 138/121 |

FOREIGN PATENT DOCUMENTS

| | | |
|---|---|---|
| JP | 3785998 | 6/2006 |
| JP | 2006-292088 | 10/2006 |
| JP | 2008-307594 | 12/2008 |
| JP | 2009-285711 | 12/2009 |
| JP | 4442541 | 3/2010 |
| JP | 2010-167440 | 8/2010 |
| JP | 4528356 | 8/2010 |
| JP | 2010-230107 | 10/2010 |
| JP | 4575995 | 11/2010 |
| JP | 4575996 | 11/2010 |

OTHER PUBLICATIONS

Notification of First Office Action dated Jun. 26, 2015 along with its English translation corresponding from Chinese Application No. 201380018513.9.

Russian Office Action dated Jun. 23, 2015 along with its English translation from corresponding Russian Application No. 2014139909.

* cited by examiner

UOE STEEL PIPE AND STRUCTURE

TECHNICAL FIELD

This disclosure relates to a UOE steel pipe applied with a tube expansion with dies in the manufacturing process, and to a structure formed by performing butt circumferential welding to the UOE steel pipes.

BACKGROUND

Due to recent increased energy demand, new gas and oil fields have been actively developed, and pipelines for transporting gas and oil have been increasingly installed in seismic zones and discontinuous permafrost zones. In seismic zones and discontinuous permafrost zones, however, the ground sometimes goes through large deformation due to liquefaction, fault displacement, and frost heaving and melting, or the like, thereby causing the pipelines buried in the ground to deform as well.

A plastically deformed pipeline buried in extremely deformed ground is also affected later on by large displacements. When an excessive displacement acts on the pipeline, a steel pipe making up the pipeline becomes bent, the compressive side of the pipeline buckles, and the buckled portion or the tensile side of the pipeline that is on the opposite side of the buckled portion fractures. To prevent damage to the steel pipe at the buckled portion and prevent gas or oil leakage from the buckled portion, high deformation performance is sought in steel pipes.

In the field of pipeline manufacture, main factors considered important in improving deformation performance of a steel pipe are steel material characteristics, particularly, the yield ratio of the steel material. Japanese Patent No. 4528356, Japanese Patent No. 4575995 and Japanese Patent No. 4575996 disclose techniques of manufacturing a steel pipe with improved deformation performance by reducing the axial yield ratio of a steel material of an electric resistance welded pipe with a composition and a dual-phase structure including a soft phase and a hard phase. In the technique of manufacturing a steel pipe with improved deformation performance disclosed in Japanese Patent No. 4442541, the yield ratio of a steel material of an electric resistance welded pipe is lowered by applying a strain in the plate-thickness direction and the length direction to the steel material during the process of incoming correction and rotation correction.

In the field of pipeline manufacture, it is also known to prevent buckling of the pipeline by identifying a region to which buckling countermeasures are to be provided, and increasing the stiffness near the region. In the technique disclosed in Japanese Patent Application Laid-open No. 2006-292088, because buckling near the welded portion leads to a tensile fracture, buckling near a welded portion is prevented by improving the local stiffness, by performing weld reinforcement to the ends of the steel pipe.

In relation to the shape of a UOE steel pipe, Japanese Patent Application Laid-open No. 2010-167440 discloses a technique that corrects the circularity of pipe ends using semicircular upper and lower dies to prevent reduction in weldability due to mismatching of the shapes between the pipe ends to be welded in a centered arrangement with respect to each other. In the technique disclosed in Japanese Patent No. 3785998, a portion of a steel pipe not corrected with dies alone are pressed with rollers while rotating the steel pipe so that the circumferential irregularity in the circularity of the pipe ends resulted from the die shape are corrected and brought nearer to a true circle. The techniques disclosed in Japanese Patent Application Laid-open No. 2010-167440 and Japanese Patent No. 3785998 both ensure circularity of pipe ends by correcting the circumferential shape of the pipe ends.

A steel pipe structure such as a pipeline, a steel pipe pile, or a steel pipe sheet pile is a long structure formed by welding together a plurality of steel pipes in the longitudinal direction, each pipe of which has a length of approximately 12 meters to 24 meters. When an extensive deformation such as that of ground acts on such a steel pipe structure, the welded portion as well as the base material portion are both bent and deformed. It is generally known that the welded portion and the base material portion are different in stiffness because of the difference in the plate thickness resulting from weld reinforcement or the like or overmatching of a welding material, and that a pipe buckles mainly near the welded portion, in the bending-buckling tests of steel pipes. This tendency suggests that the welded portion has a lower deformation performance than the base material portion, and there is a limitation in increasing the yield ratio of the base material portion. Hence, the techniques disclosed in Japanese Patent No. 4528356, Japanese Patent No. 4575995, Japanese Patent No. 4575996 and Japanese Patent No. 4442541 alone cannot achieve a certain improvement of the deformation performance of the welded portion, when under consideration is a pipeline, and not a single steel pipe.

The technique disclosed in Japanese Patent Application Laid-open No. 2006-292088 aims to prevent a tensile force from overcoming defects in the circumferential welded portion. To achieve this goal, that technique reinforces the stiffness of a certain section near the circumferential welded portion by providing weld reinforcement to the section with a welding machine so that the buckling is prevented only near the circumferential welded portion. Generally, when a steel pipe buckles, the tensile strain overcomes the resistance on the rear side of the buckled portion, and causes the portion to fracture. With the technique disclosed in Japanese Patent Application Laid-open No. 2006-292088, therefore, concentration of tensile strain on a circumferential welded portion can be prevented. While the disclosure in Japanese Patent Application Laid-open No. 2006-292088 enables buckling prevention through stiffness improvement, buckling still occurs in portions not provided with weld reinforcement, near where the weld reinforcement ends. Furthermore, a steel pipe structure is expected to buckle with a smaller deformation than that in a structure only with a base material portion, due to the difference in the stiffness between the base material portion and the circumferential welded portion. While the technique disclosed in Japanese Patent Application Laid-open No. 2006-292088 can achieve the goal of preventing the fracture of a circumferential welded portion, deformation performance of the entire steel pipe structure still remains low.

Furthermore, the techniques disclosed in Japanese Patent Application Laid-open No. 2010-167440 and Japanese Patent No. 3785998 are also intended to improve the ease of welding at a circumferential joint. With the techniques disclosed in Japanese Patent Application Laid-open No. 2010-167440 and Japanese Patent No. 3785998, while the shape of the steel pipe is mainly corrected in the circumferential direction so that the circularity is improved, these techniques do not directly contribute to the improvement in the axial shape of a pipe. To prevent buckling of a steel pipe, correcting an axial shape is important, as will be described later. The techniques disclosed in Japanese Patent Application Laid-open No. 2010-167440 and Japanese Patent No. 3785998, therefore, are considered incapable of preventing buckling of a structure.

It could therefore be helpful to provide a UOE steel pipe with which a structure with improved buckling performance can be formed, and to provide a structure with improved buckling performance.

SUMMARY

Our UOE steel pipes are used to form a structure by performing butt circumferential welding and have an outside diameter shape in a waveform in a longitudinal direction. The UOE steel pipe is characterized by being shaped to have no local minimum of the outside diameter shape in the waveform within a predetermined length from both longitudinal end portions.

In the above-described UOE steel, the UOE steel pipe is formed with control to have no local minimum of the outside diameter shape in the waveform of $2.26\lambda$ to $3.86\lambda$ (where $\lambda$ is an initial buckling half-wavelength of the UOE steel pipe) from both longitudinal end portions.

In the above-described UOE steel pipe, control is performed by adjusting a longitudinal distance by which expander dies are carried when expanding the UOE steel pipe.

In the above-described UOE steel pipe, control is performed by cutting off the longitudinal end portions.

In the above-described UOE steel pipe, a flat portion where a variation amount in a pipe diameter is equal to or less than 0.02 percent of an outer diameter of the UOE steel pipe is provided at least to a range of $2\lambda$ from both longitudinal end portions in the longitudinal direction (where $\lambda$ is an initial buckling half-wavelength of the UOE steel pipe).

A structure is formed by performing butt circumferential welding to the longitudinal end portions of the UOE steel pipe according to the present invention.

Thus, a UOE steel pipe with which a structure with improved buckling performance can be formed, and a structure with improved buckling performance can be provided.

REFERENCE SIGNS LIST

Figure 1:
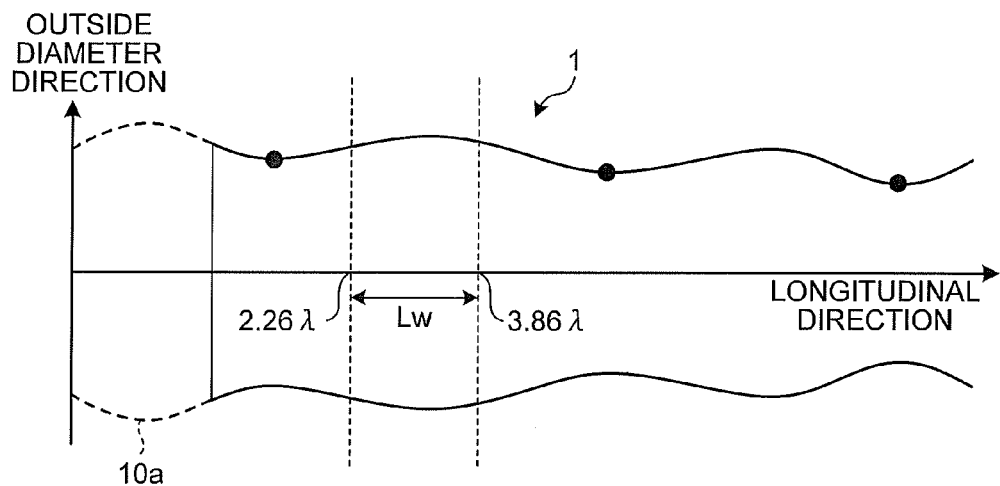
FIG. 1 is a schematic illustrating the shape of a longitudinal end portion of a UOE steel pipe according to a first example.

1, 2 UOE steel pipe
2*a* flat portion
10, 11 general UOE steel pipe
10*a* end portion

DETAILED DESCRIPTION

Selected UOE steel pipes will now be explained.
First Structure
To begin with, a UOE steel pipe according to a first structure will now be explained.

A steel pipe with even stiffness across the entire longitudinal direction is known to buckle more easily near the longitudinal end portions. Generally practiced in the steel pipes used in a structure such as a pipeline, a steel pipe pile, or a steel pipe sheet pile is circumferential welding the longitudinal end portions of the steel pipes, and the strength of the circumferential welded portion is increased to a level higher than that of the base material of the steel pipe. In other words, the stiffness of the circumferential welded portion is increased to a level higher than that of the other portion. When a steel pipe has a stiffer portion, the portions near the stiffer portion buckles less easily. A steel pipe with a circumferential welded portion therefore buckles at a position that is somewhat further away from the circumferential welded portion.

However, no theoretical elucidation has been made regarding a position where a steel pipe having a circumferential welded portion in the middle of the longitudinal direction, e.g., a pipeline, buckles. To identify the point at which the steel pipe buckles near the circumferential welded portion, we conducted steel pipe bending experiments using an actual steel pipe, and further conducted an analysis in the same conditions with those of the experiment using the finite element method, using an exemplary steel pipe having an outer diameter of ϕ48 inches (1219 millimeters), a plate thickness of 22.0 millimeters, and a length of 8000 millimeters, and provided with a circumferential welded portion at the longitudinal center, the circumferential welded portion achieved by multi-pass weld with eleven passes (approximately 1.1 to 2.0 kJ/mm) using the weld material MG-S70.

As a result, we found out that there is a tendency that the pipe buckles at positions approximately from 450 millimeters to 770 millimeters from the circumferential welded portion in the longitudinal direction. It can therefore be inferred that, if there is any outside diameter shape likely to induce buckling within 450 millimeters to 770 millimeters from the circumferential welded portion in the longitudinal direction, buckling will be induced at that region, and the deformation performance of the entire steel pipe will be reduced thereby.

The process of manufacturing a UOE steel pipe includes a process of improving the shaping precision of a steel pipe by inserting dies into the pipe and repeating expansion at a predetermined interval. The resultant UOE steel pipe has an outer shape with continuous larger-diameter portions and smaller-diameter portions, that is, has an outer shape waving in the longitudinal cross section. In the UOE steel pipe, buckling is likely to occur at a region corresponding to a local minimum in the waveform.

Considering such an outer shape characteristic of a UOE steel pipe and the position at which a steel pipe with a circumferential welded portion is likely to buckle, when a UOE steel pipe has an outer diameter of ϕ48 inches and a plate thickness of 22.0 millimeters, is welded in the longitudinal direction, and has a waveform with a local minimum within a range of 450 millimeters to 770 millimeters from the circumferential welded portion, the subtle variation in the outside diameter shape causes the pipe to buckle, thereby reducing the deformation performance of the entire steel pipe.

We compared deformation performance of a steel pipe having a circumferential welded joint and of which the waveform has a local minimum at 600 millimeters from the circumferential welded portion in the longitudinal direction, with the buckling performance of another steel pipe of which the waveform does not have a local minimum within 450 millimeters to 770 millimeters from the circumferential welded portion in the longitudinal direction. While the former demonstrated a 2De moving average strain (an index of bend curvature representing the amount of compressive strain at which buckling occurs when the gauge point is set to twice an outer diameter De) of 1.35 percent, the 2De moving average strain of the latter was 1.55 percent.

Based on these findings, for a steel pipe with an outer diameter of ϕ48 inches and a plate thickness of 22.0 millimeters, the buckling resistance can be improved by approximately 15 percent by controlling the shape of the longitudinal end portions of the UOE steel pipe so that no local minimum of the waveform is at positions from 450 millimeters to 770 millimeters from the circumferential welded portion in the longitudinal direction, compared to that with a waveform having a local minimum within the range.

Used in the explanation above is an exemplary steel pipe with an outer diameter of ϕ48 inches and a plate thickness of 22.0 millimeters, but the range explained above can change depending on the diameter and the plate thickness of the steel pipe. We therefore conducted analytical experiments with steel pipes with different diameters and plate thicknesses, and investigated a range where the steel pipe buckles. We then found that there is a correlation between a range in which buckling occurs and an initial buckling half-wavelength of the steel pipe.

An initial buckling half-wavelength $\lambda$ of a steel pipe can be calculated as $1.72\sqrt{(De/2*t)}$ (where De is an outer diameter of the pipe end, and t is a plate thickness of the steel pipe). Using the initial buckling half-wavelength $\lambda$ of a steel pipe, the range in which buckling occurs can be expressed as $2.26\lambda$ to $3.86\lambda$ from the circumferential welded portion in the longitudinal direction. Buckling resistance is lower within the range from $2.26\lambda$ to $3.86\lambda$, compared with the buckling resistance equivalent to the steel pipe base material, and the lowest performance is marked within a range from $2.76\lambda$ to $3.13\lambda$.

Based on the results of the experiments, to improve buckling resistance of a pipeline that is UOE steel pipes welded together in the axial direction, the shape of the longitudinal end portions may be controlled to have no local minimum in the waveform within a range from $2.26\lambda$ to $3.86\lambda$ from the circumferential welded portion. In this manner, the pipe becomes less likely to buckle at the area where the buckling resistance is low because of the circumferential welding so that the pipe is prevented from buckling at a region where buckling is most likely to occur. Buckling is then induced at a steel pipe base material portion that is not affected by the circumferential welded portion so that deformation performance of the entire pipeline is defined by the deformation performance expected in the steel pipe base material.

A specific structure of a UOE steel pipe according to the first structure will now be explained.

Figure 2:
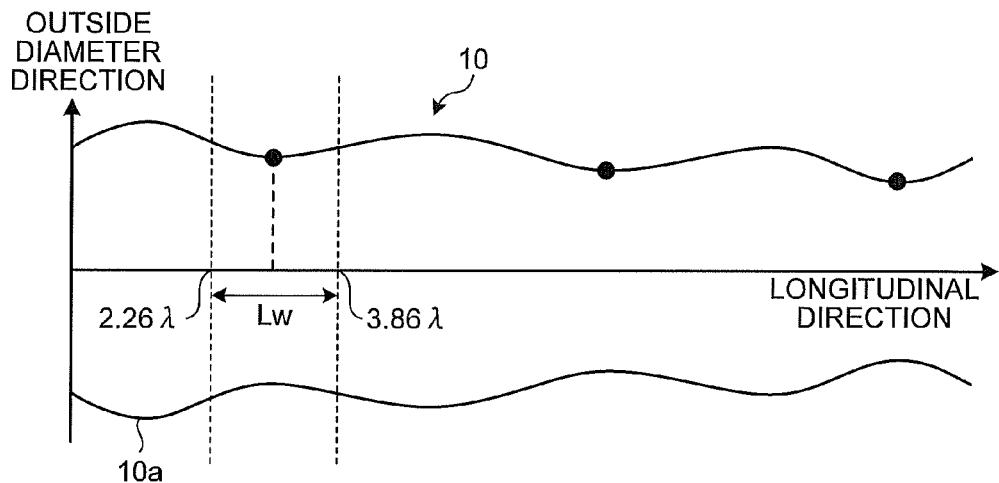
FIG. 2 is a schematic illustrating the shape of a longitudinal end portion of a general UOE steel pipe.

The manufacturing process of a UOE steel pipe includes a process of improving the shaping precision of a steel pipe by inserting dies into the pipe and repeating the expansion at a predetermined interval. On the resultant longitudinal cross section of a general UOE steel pipe 10, the surface of the pipe has a waveform, as illustrated in FIG. 2. In FIG. 2, a black circle is provided at a region in which the waveform has a local minimum. When the waveform has a local minimum within a range Lw of $2.26\lambda$ to $3.86\lambda$ from the longitudinal end portions, as in the UOE steel pipe 10 illustrated in FIG. 2, buckling resistance becomes reduced.

In UOE steel pipe 1, therefore, an end portion 10a (a range within 500 millimeters from the end surface) of the UOE steel pipe 10 illustrated in FIG. 2 is cut off so that no local minimum in the waveform does not appear within the range Lw from $2.26\lambda$ to $3.86\lambda$ from a longitudinal end portion, as illustrated in FIG. 1, where $\lambda$ denotes to an initial buckling half-wavelength of the UOE steel pipe 1, and $\lambda=1.72\sqrt{(De/2*t)}$ (where De is the outer diameter of the pipe end, and t is the plate thickness of the UOE steel pipe).

Using a function F(x) to represent the waveform appearing in the longitudinal cross section of the UOE steel pipe 1 and the UOE steel pipe 10 illustrated in FIGS. 1 and 2, respectively, the absence of the local minimum in the waveform within the range from $2.26\lambda$ to $3.86\lambda$ from a longitudinal end portion can be expressed as Equation (1) below not being satisfied.

$$De<F(2.26\lambda)\&De<F(3.86\lambda)\&F'(Lx)=0 \qquad (1)$$

Where Lx is a longitudinal distance from an end of the pipe, and is $2.26\lambda<Lx<3.86\lambda$, and De is the outer diameter of the pipe end.

The UOE steel pipe 1 is formed to have no local minimum in the waveform appearing in the longitudinal cross section within the range from $2.26\lambda$ to $3.86\lambda$ from the longitudinal end portions. Any form inducing buckling does not appear in a location where buckling resistance is likely to be low near the circumferential welded portion, that is, within $2.26\lambda$ to $3.86\lambda$ from the longitudinal end portions so that the buckling resistance of the entire structure made from the steel pipes welded together can be improved.

As a way of controlling the shape of the longitudinal end portions, the pipe end portion 10a of the UOE steel pipe 10 having manufactured is cut off. Alternatively, the distance by which the expander dies are carried may be adjusted in the manufacturing process of the UOE steel pipe to control the shape of the longitudinal end portions to have no local minimum in the waveform of $2.26\lambda$ to $3.86\lambda$ from the longitudinal end portions.

The results of steel pipe bending experiments and analytical experiments conducted to confirm the effect of the structure will now be explained.

Examples

Steel Pipe Bending Experiments

First Experiment

Used in this experiment was a UOE steel pipe with an outer diameter of 48 inches and a plate thickness of 22 millimeters. Prior to the experiment, the shape of the outer surface of the steel pipe was measured. The result indicated that the outer surface of the steel pipe had a waving form. This waving form was the result of expansion with dies during the manufacturing process of the UOE steel pipe, and the cycle at which the form changes was near the cycle at which the expansion is carried out, and the amplitudes of the waveform were almost the same, indicating that such a waveform resulted from a constant mechanical diameter expansion. In the tested steel pipe, a local minimum in the waveform was found at a position approximately 550 millimeters from the circumferential welded portion of the steel pipe. The position at 550 millimeters in the test pipe corresponds to 2.8λ, and falls within 2.26λ to 3.86λ.

As a result of the bending test, the steel pipe buckled at a position of 500 millimeters near the circumferential welded portion, and became further bent at this portion. The peak of the bending moment occurred because the steel pipe buckled and the resistance of the pipe started to fall. When this result was compared to a result of a bending test conducted on a steel pipe made of a same material but without a circumferential welded portion, the former indicated a deformation performance lower by approximately 15 percent. We therefore confirmed that buckling near the circumferential welded portion was a factor that reduced deformation performance of the entire steel pipe.

Second Experiment

The same experiment was conducted using a UOE steel pipe with a local minimum in the waveform is at 300 millimeters (1.5λ) from the circumferential welded portion as a test piece. As a result, the steel pipe indicated a buckling resistance at approximately the same level as that of a UOE steel pipe without a circumferential welded portion.

Based on the results of the first and the second experiments, we confirmed that the buckling resistance was lower when the waveform had a local minimum of 2.26λ to 3.86λ, and the buckling resistance was not affected when the waveform had a local minimum at positions outside of 2.26λ to 3.86λ.

Analytical Experiment

Figure 3:
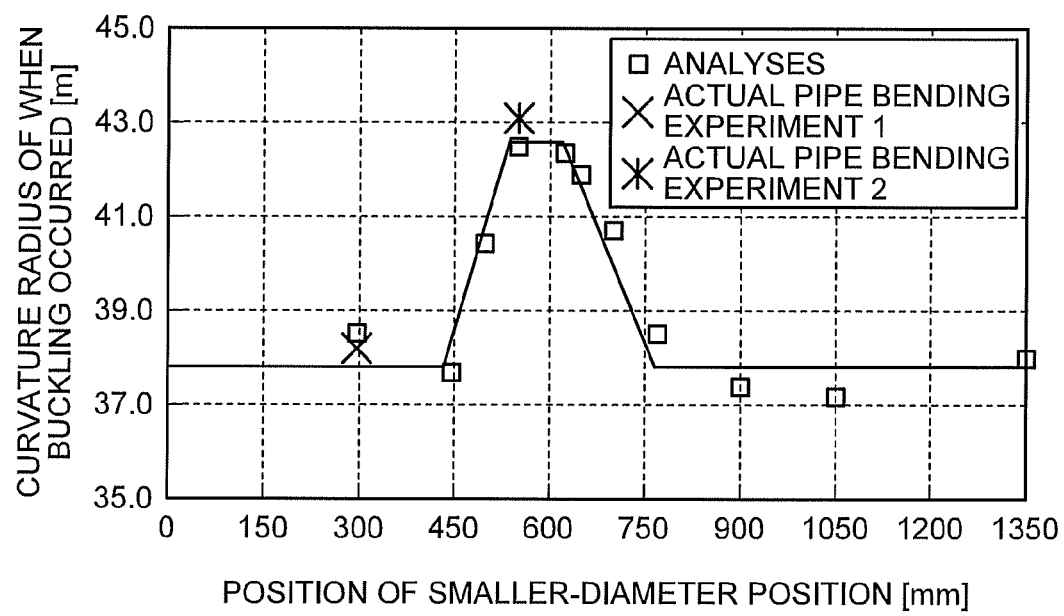
FIG. 3 is a graph indicating the results of analytical experiments.

The results of the steel pipe bending experiments conducted with the actual pipes demonstrated that a local minimum in the waveform near the circumferential welded portion affects buckling of a steel pipe. We then conducted analytical experiments using a steel pipe with the same outer shape and plate thickness as the steel pipe used in the steel pipe bending experiments (outer diameter of 48 inches and a plate thickness of 22 millimeters), while changing the position of a local minimum in the waveform at a pitch of 150 millimeters within a range from 300 millimeters to 1050 millimeters near the circumferential welded portion. The results of the experiments are indicated in the graph in FIG. 3. The vertical axis in the graph in FIG. 3 represents a curvature radius (meters), and the horizontal axis represents a distance (millimeters) from a longitudinal end portion to the local minimum. In the graph of FIG. 3, the results of the bending experiments conducted on the actual pipes are also included.

Looking at the graph in FIG. 3, when the waveform had a local minimum at the positions of 300 millimeters and 450 millimeters, the curvature radius causing the pipe to buckle was near 37 meters. By contrast, when the waveform had a local minimum within the range from 450 millimeters to 750 millimeters, buckling occurred at a larger curvature radius, indicating a lower buckling resistance. 300 millimeters correspond to 1.5λ, 450 millimeters correspond to 2.26λ, and 750 millimeters correspond to 3.86λ. This experiment analytically demonstrated that, when the waveform has the local minimum of 2.26λ to 3.86λ, the buckling resistance of the portion is lower and, when the waveform has no minimum within the range, the welded portion can achieve deformation performance expected in the pipe base material.

Second Structure

A UOE steel pipe according to a second structure will now be explained.

A pipeline is likely to buckle near a circumferential joint due to the difference in the stiffness near the circumferential welded portion. Buckling often occurs at a position further away from the circumferential welded portion approximately by an initial buckling half-wavelength λ determined by the plate thickness and the outer diameter of the steel pipe. To prevent buckling, the stiffness of the section in which the pipeline is likely to buckle may be increased, or the dimensional characteristics of the pipeline may be improved. However, when the stiffness of the position where buckling occurs is increased, it merely changes the position where the pipeline buckles, and the amount of bending deformation resulting from buckling and the amount of strain at the buckled portion remain the same. We therefore focused on the improvement of dimensional characteristics, in particular, on the axial distribution of the outer shapes, among the dimensional characteristics, as a factor more likely to affect buckling largely.

A UOE steel pipe is an example of a steel pipe having an axial distribution of the outer shapes. The process of manufacturing a UOE steel pipe includes improving the circularity of the steel pipe by inserting dies into the pipe and repeating expansion at a predetermined interval. The resultant outer shape of the UOE steel pipe has larger-diameter portions and smaller-diameter portions that are continuous, that is, a waving form in the longitudinal cross section. Such a UOE steel pipe is likely to buckle at a region with a local minimum in the waveform. When a pipeline achieved by welding steel pipes together has a local minimum at a position at which buckling is likely to occur, the subtle variation in the outside diameter shape causes the pipeline to buckle, and as a result, the deformation performance of the entire steel pipe becomes reduced.

We had an idea of flattening (so that there is no or little change in the radial directions in the steel pipe) the portion where buckling is likely to occur in the pipeline, as an improvement of the dimensional characteristics. We then carried out research on a relation between the length of the flat portion and deformation performance by conducting an experiment and an analysis in the same conditions with those of the experiment using the finite element method, using an exemplary steel pipe having an outer diameter of φ48 inches (1219 millimeters), a plate thickness of 22.0 millimeters, and a length of 8000 millimeters, and provided with a circumferential welded portion at the longitudinal center, the circumferential welded portion achieved by multi-pass weld with 11 passes (approximately 1.1 to 2.0 kJ/mm) using the weld material MG-570.

The result indicated that, the steel pipe with a flat portion covering a range of approximately 400 millimeters from the longitudinal end portion had a deformation performance equivalent to that without any circumferential joint. While the deformation performance of a steel pipe with a circumferential joint and no flat longitudinal end portions was 1.35 percent in the 2De moving average strain (an index of bend curvature representing the amount of compressive strain causing buckling to occur with a gauge point set twice the outer diameter De), the steel pipe with a flat portion approximately 400 millimeters (2λ) or more indicated the performance of 1.55 percent, allowing the inventors to confirm a buckling resistance improvement of approximately 15 percent.

In the explanation above, an exemplary steel pipe with an outer diameter of φ48 inches and a plate thickness of 22.0 millimeters was used, but the length of the flat portion might change depending on the diameter or the plate thickness of the steel pipe. We therefore conducted analytical experiments using steel pipes with different diameters and plate thicknesses to look for a range in which buckling occurs, and found that there was a correlation between a range in which the buckling occurs and the initial buckling half-wavelength λ of the steel pipe. The initial buckling half-wavelength λ of the steel pipe can be calculated as $1.72\sqrt{(De/2 \ast t)}$ (where De is the outer diameter of the pipe end, and t is the plate thickness of the steel pipe), and the range in which buckling occurs can be expressed as, using the initial buckling half-wavelength λ of the steel pipe, a range of 2λ from the circumferential welded portion in the longitudinal direction.

Based on these investigations, to improve the buckling resistance of a pipeline made from UOE steel pipes welded together in the axial direction, a range of 2λ from the circumferential welded portion can be made flat so that no local minimum in the waveform is formed in any location at which buckling is likely to occur, thereby reducing the likeliness of the pipe buckling at the region, and causing the pipe to buckle at the other regions. Because the other regions are steel pipe base material portions away from the circumferential welded portion, deformation performance of the entire pipeline is defined by deformation performance expected in the steel pipe base material.

Because it is impossible to achieve complete flatness on the outer diameter of an actual pipe, we experimented with the degree of flatness of the outer diameter where the advantageous effect is achieved. As a result, we confirmed that, by controlling the amount of variation observed in the longitudinal cross section of the outer diameter to 0.02 percent or less of the outer diameter of the steel pipe, an effect almost the same as that achieved with complete flatness can be achieved. In the explanation above, a UOE steel pipe was used as an example of a steel pipe having an axial distribution of the outer shapes, but the findings described above are not limited to UOE steel pipes.

A specific structure of a UOE steel pipe according to the second structure will now be explained. In the explanation hereunder, a UOE steel pipe is used as an example of a steel pipe having an axial distribution of the outer shapes.

Figure 5:
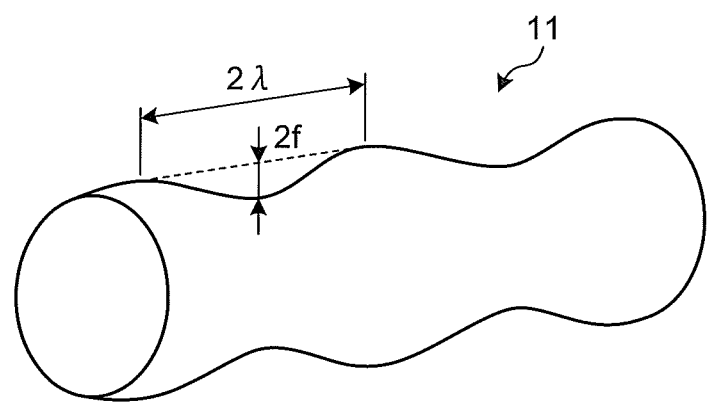
FIG. 5 is a schematic illustrating the shape of a longitudinal end portion of a general UOE steel pipe.

Because the process of manufacturing a UOE steel pipe includes a process of improving the precision of formation of a steel pipe by inserting dies in the pipe and repeating expansion at a predetermined interval, a waveform with a wavelength of 2λ and an amplitude of f is formed on the outer surface of the resultant general UOE steel pipe 11 in the longitudinal cross section, as illustrated in FIG. 5. If the waveform has a local minimum within a range of approximately 2λ from the end portions of the UOE steel pipe 11, the buckling resistance is reduced.

Figure 4:
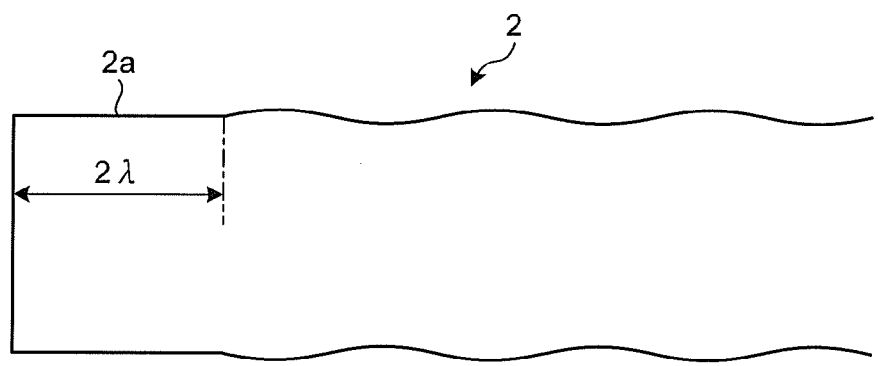
FIG. 4 is a schematic illustrating the shape of a longitudinal end portion of a UOE steel pipe according to a second example.

The UOE steel pipe 2 is therefore shaped with a flat portion 2a covering a range of 2λ from the end portions, as illustrated in FIG. 4. Where λ is the initial buckling half-wavelength of the steel pipe, and $\lambda=1.72\sqrt{(De/2*t)}$ (where De is an outer diameter of the pipe end, and t is a plate thickness of the UOE pipe). The flat portion 2a is a portion in which the amount of variation in the outer shape of the pipe is controlled to 0.02 percent or less of the steel pipe outer diameter.

An exemplary way to manufacture a UOE steel pipe 2 of which each longitudinal end portion is provided with a flat portion 2a is expanding the steel pipe with expander dies at a shorter interval during the process of manufacturing the UOE steel pipe. By using a shorter expander interval, the waveforms overlap each other so that the amplitude and the frequency are both reduced. The way in which the flat portion 2a is formed is not limited thereto, and may be done in any other ways.

Because the UOE steel pipe 2 has the flat portion 2a covering a range of 2λ from the corresponding longitudinal end portion, there is no form that induces buckling in any location where buckling resistance is likely to be low near the circumferential welded portion, that is, within a range of 2λ from the corresponding longitudinal end portion so that buckling resistance of the entire structure formed by circumferential welding the end portions of a plurality of steel pipes can be improved. Examples of a structure formed by circumferential welding steel pipes include a pipeline, a steel pipe pile, and a steel pipe sheet pile.

In the description above, a UOE steel pipe is used as an example of a steel pipe having an axial distribution of the outer shapes, but our pipes are not limited to UOE steel pipes, and can achieve the same advantageous effects in any steel pipe manufactured in any method.

Explained now are some results of steel pipe bending experiments and analytical experiments to validate advantageous effects achieved by the second structure.

Example

Steel Pipe Bending Experiment

Figure 6A:
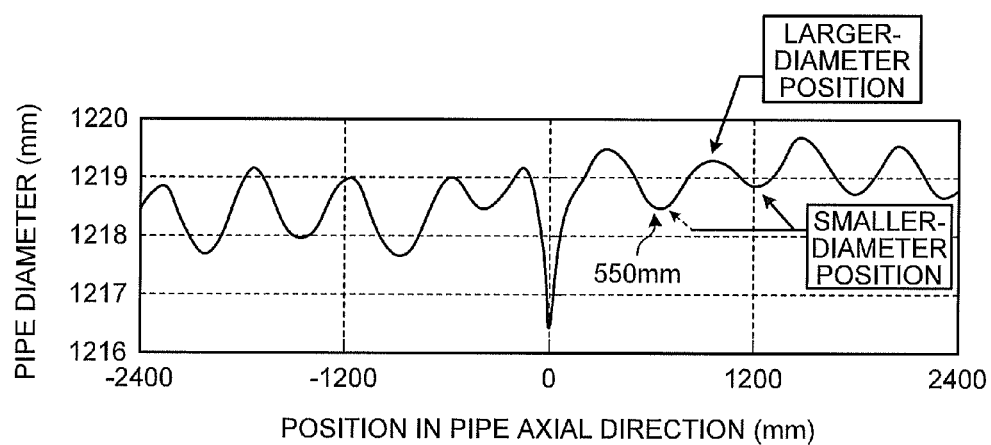
FIG. 6A is a graph indicating an exemplary distribution of longitudinal shapes in a UOE steel pipe.
Figure 6B:
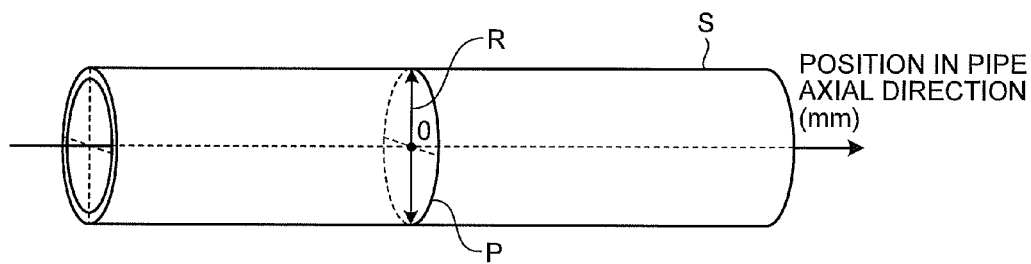
FIG. 6B is a schematic illustrating a relation between the position of a circumferential welded portion and an axial position in a UOE steel pipe.

In this experiment, a UOE steel pipe with an outer diameter of 48 inches and a plate thickness of 22 millimeters was used. Prior to the experiment, the shape of the outer surface of the steel pipe was measured. The graph in FIG. 6A illustrates the distribution of shapes on the tested UOE steel pipe. The vertical axis represents the pipe diameter (millimeters), and the horizontal axis represents a position in the axial direction (millimeters). In this experiment, the position of the circumferential welded portion P of the UOE steel pipe S illustrated in FIG. 6B was set to zero (millimeters) in the axial direction.

As illustrated in FIG. 6A, waving of the outer surface was observed in the tested UOE steel pipe. This waving shape is a result of expansions with dies in the process of manufacturing the UOE steel pipe. The frequency of the shape variation was therefore near the frequency of the expansion, and all of the amplitudes resulted from the mechanical expansion were almost constant. On the tested steel pipe, the local minimum in the waveform was found at a position approximately 550 millimeters from the circumferential welded portion of the steel pipe.

Figure 7A:
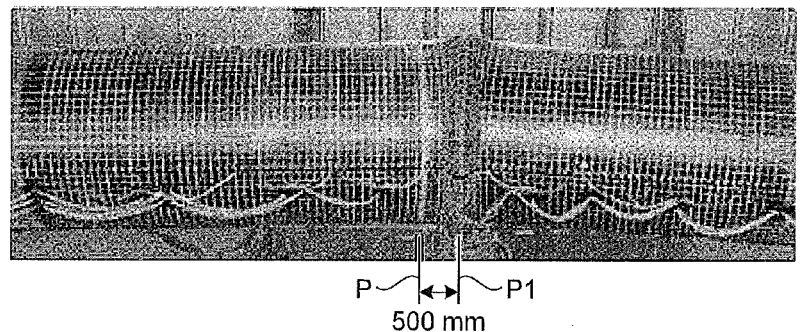
FIG. 7A is a photograph indicating the result of a steel pipe bending experiment.
Figure 7B:
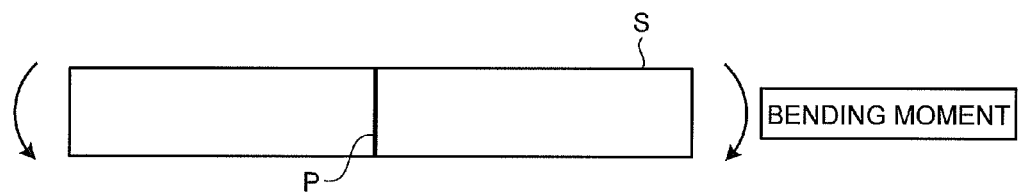
FIG. 7B is a schematic illustrating the initial condition of a steel pipe.
Figure 7C:
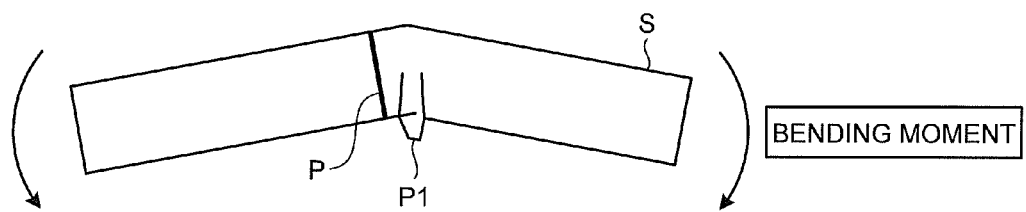
FIG. 7C is a schematic illustrating a condition of the steel pipe to which a bending moment is applied.
Figure 8A:
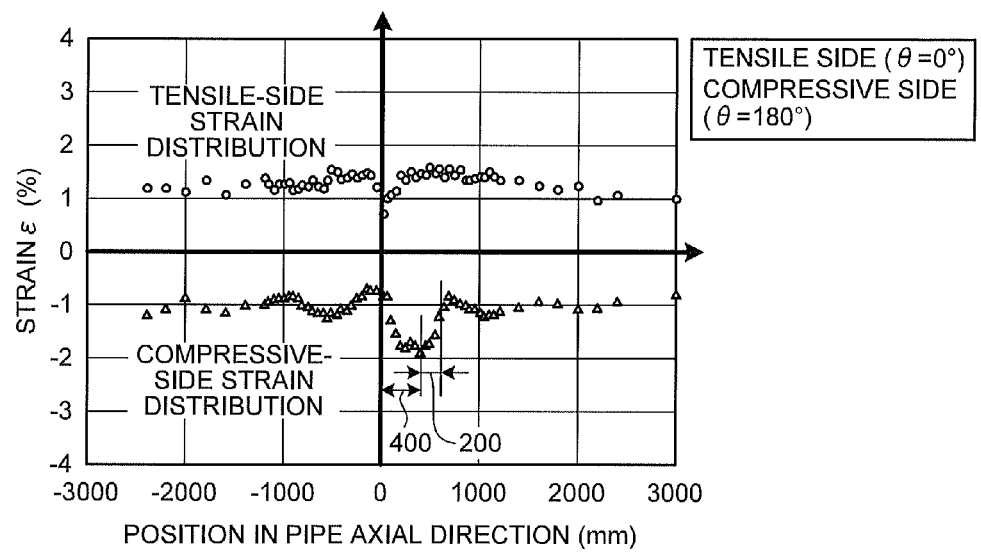
FIG. 8A is a schematic illustrating an exemplary strain distribution at the time of buckling.

FIG. 7A is a photograph indicating the result of a steel pipe bending experiment. In this experiment, a bending moment was applied to bend the steel pipe S that was initially straight, thereby forming a buckled portion P1 near the circumferential welded portion P, as illustrated in FIGS. 7B and 7C. Hereinafter, an "axial position" is determined with reference to the circumferential welded portion P (=0). FIG. 8A is a graph of the strain distribution at the time of buckling, and the vertical axis represents a strain ε (percent), and the horizontal axis represents an axial position (millimeters) in the steel pipe.

Figure 8B:
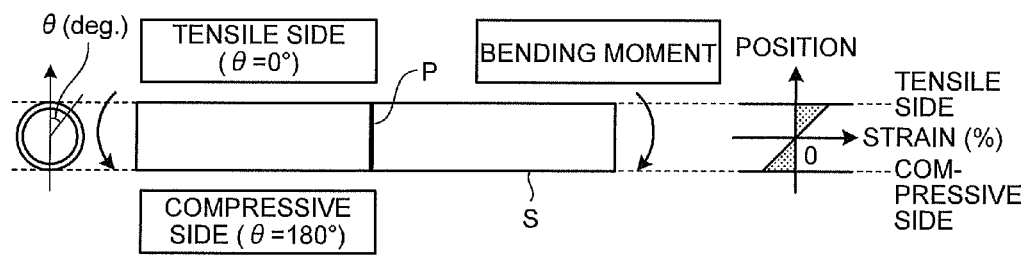
FIG. 8B is a schematic for explaining a tensile strain and a compressive strain.

In FIG. 8A, the tensile strain distribution represents a strain distribution measured at a circumferential position of θ=0 degrees on the surface of the steel pipe S, as illustrated in FIG. 8B. The compressive strain distribution represents a strain distribution measured at a circumferential position of θ=180 degrees on the surface of the steel pipe S. A uniform strain distribution was observed before the pipe buckled. After the pipe buckled, a prominent increase of compressive strain (the large buckling surge at the position longitudinally +500 millimeters from the circumferential welded portion illustrated in FIG. 7A) was observed at the buckled region, as illustrated in FIG. 8A.

Analytical Experiments

Figure 9:
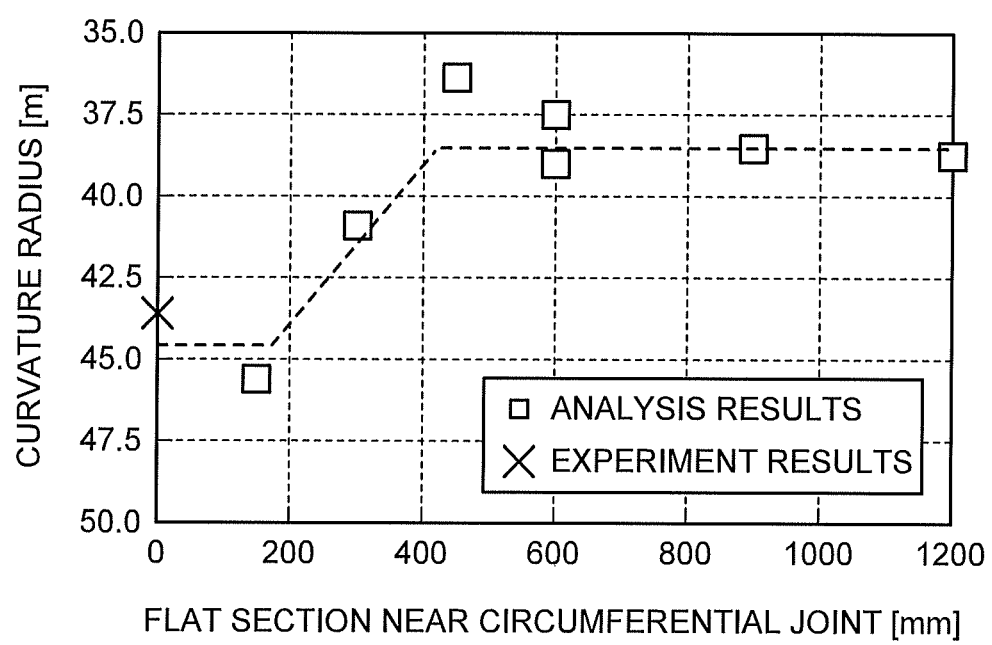
FIG. 9 is a graph indicating the results of analytical experiments.

The result of the steel pipe bending experiment conducted with the actual pipe demonstrated that the local minimum in the waveform near the circumferential welded portion affects how the steel pipe buckles. Based on this result, we conducted analyses on a steel pipe with no local minimum in the waveform near the circumferential welded portion, while changing the length of the flat region without a local minimum in the waveform. FIG. 9 is a graph indicating the analysis results. The vertical axis represents a curvature radius (meters), and the horizontal axis represents the length of the flat section near the circumferential joint (millimeters).

As illustrated in FIG. 9, the result traced a curve reaching the upper boundary at a flat portion length of approximately 400 millimeters. With no flat portion, the buckling resistance was lower by 15 percent or so. With a flat portion with a length of approximately 400 millimeters or more, a deformation performance equivalent to that of a steel pipe without any weld was achieved.

Based on this result, it was demonstrated that, given a flat portion in a length of 400 millimeters or so, a steel pipe with an outer diameter of ϕ48 inches and a plate thickness of 22 millimeters can achieve a deformation performance equivalent to that of a steel pipe material. As mentioned earlier, such a length of the flat portion can change depending on the diameter and the plate thickness of the pipe, and is correlated with the initial buckling half-wavelength $\lambda$ of the steel pipe. In the steel pipe with an outer diameter of ϕ48 inches and the plate thickness (22 millimeters), $\lambda$ is approximately 200 millimeters.

From the graph provided in FIG. 9, reading of the length of the flat portion ensuring sufficiently high deformation performance stably is approximately 400 millimeters. In other words, by providing a flat portion that is a region less likely to buckle near the circumferential welded portion by a length corresponding to the wavelength ($2\lambda$) or more, the pipe buckles less in the area that has been originally likely to buckle, and buckles in other regions. The "other regions" are the steel pipe base material portions away from the weld. When the pipe is allowed to buckle in such regions, the deformation performance of the entire pipeline is defined by the deformation performance expected in the pipe base material.

Explained above are selected examples, but the scope of this disclosure is not limited in any way by the descriptions and the drawings that are a part of the disclosure. For example, one or both of the UOE steel pipe according to the first structure and the UOE steel pipe according to the second structure may be selected depending on the performance of the facility used in shaping the UOE steel pipe, or the time of manufacturing. For example, when a long time is required to manufacture the UOE steel pipe according to the second structure, the UOE steel pipe according to the first structure may be manufactured instead. Other structures, examples, and operation techniques achieved by those skilled in the art or the like based on these structures all fall within the scope of the appended claims.

INDUSTRIAL APPLICABILITY

A UOE steel pipe with a structure with which improved buckling performance can be formed, and a structure with improved buckling performance can be provided.

The invention claimed is:

1. A UOE steel pipe used to form a structure by performing butt circumferential welding and having an outside diameter shape in a waveform in a longitudinal direction, wherein
   the outside diameter shape in the waveform is an outer shape with continuous larger-diameter parts and smaller-diameter portions, and
   minimum diameter parts of the smaller-diameter portions are arranged outside a range of $2.26\lambda$ to $3.86\lambda$ where $\lambda$ is an initial buckling half-wavelength of the UOE steel pipe from both longitudinal end portions of the UOE steel pipe.

2. The UOE steel pipe according to claim 1, wherein the forming is performed by adjusting a longitudinal distance by which expander dies are carried when expanding the UOE steel pipe.

3. The UOE steel pipe according to claim 1, wherein the forming is performed by cutting off the longitudinal end portions.

4. The UOE steel pipe according to claim 1, wherein a flat portion where a variation amount in a pipe diameter is equal to or less than 0.02 percent of an outer diameter of the UOE steel pipe is provided at least to a range of $2\lambda$ from both longitudinal end portions in the longitudinal direction, where $\lambda$ is an initial buckling half-wavelength of the UOE steel pipe.

5. A structure formed by performing butt circumferential welding to longitudinal end portions of a UOE steel pipe, the UOE steel pipe having an outside diameter shape in a waveform in a longitudinal direction, wherein the outside diameter shape in the waveform is an outer shape with continuous larger-diameter parts and smaller-diameter portions, and
   minimum diameter parts of the smaller-diameter portions are arranged outside a range of $2.26\lambda$ to $3.86\lambda$ where $\lambda$ is an initial buckling half-wavelength of the UOE steel pipe from both longitudinal end portions of the UOE steel pipe.

6. The structure according to claim 5, wherein the forming is performed by adjusting a longitudinal distance by which expander dies are carried when expanding the UOE steel pipe.

7. The structure according to claim 5, wherein the forming is performed by cutting off the longitudinal end portions.

8. The structure according to claim 5, wherein a flat portion where a variation amount in a pipe diameter is equal to or less than 0.02 percent of an outer diameter of the UOE steel pipe is provided at least to a range of $2\lambda$ from both longitudinal end portions in the longitudinal direction, where $\lambda$ is an initial buckling half-wavelength of the UOE steel pipe.

* * * * *